US011912078B1

(12) United States Patent
Creager et al.

(10) Patent No.: US 11,912,078 B1
(45) Date of Patent: Feb. 27, 2024

(54) SHAPE MEMORY ALLOY (SMA) TUBULAR STRUCTURE

(71) Applicant: United States of America as represented by the Administrator of NASA, Washington, DC (US)

(72) Inventors: Colin M. Creager, Cleveland, OH (US); Santo A. Padula, II, Cleveland, OH (US); Calvin Young, Cleveland, OH (US)

(73) Assignee: United States Government Administrator of NASA, Washington, DC (US)

( * ) Notice: Subject to any disclaimer, the term of this patent is extended or adjusted under 35 U.S.C. 154(b) by 569 days.

(21) Appl. No.: 17/119,632

(22) Filed: Dec. 11, 2020

Related U.S. Application Data

(60) Provisional application No. 63/077,138, filed on Sep. 11, 2020.

(51) Int. Cl.
*B60C 7/06* (2006.01)
*B60C 7/14* (2006.01)
*C22C 19/03* (2006.01)

(52) U.S. Cl.
CPC .................. *B60C 7/06* (2013.01); *B60C 7/14* (2013.01); *B60C 2200/12* (2013.01); *C22C 19/03* (2013.01)

(58) Field of Classification Search
CPC .... B60C 7/06; B60C 7/14; B60C 7/16; B60C 7/18; B60C 7/20; B60C 2200/12; C22C 19/03
See application file for complete search history.

(56) References Cited

U.S. PATENT DOCUMENTS

| 1,354,363 A | * | 9/1920 | Widenhofer | B60C 7/14 |
| | | | | 152/384 |
| 3,763,910 A | * | 10/1973 | Hawes | B60C 7/18 |
| | | | | 152/14 |
| 6,032,710 A | * | 3/2000 | Milman | B60C 7/14 |
| | | | | 152/13 |

(Continued)

FOREIGN PATENT DOCUMENTS

DE          10123008 A1 * 11/2002 ............... B60C 7/16

OTHER PUBLICATIONS

Translation of DE 10123008 A1, 5 pages (Year: 2002).*

*Primary Examiner* — S. Joseph Morano
*Assistant Examiner* — Emily G. Castonguay
(74) *Attorney, Agent, or Firm* — Robert H. Earp, III; Mark Wolfgang; Trenton J. Roche (57) ABSTRACT

The innovation presented herein provides among its embodiments, a non-pneumatic structure such as a vehicle tire, consisting of a matrix of shape memory alloy (SMA) elements. The interlocking layering pattern provides geometries which leverage the SMA material properties to accomplish performance characteristics of traditional pneumatic structures across a spectrum of possible desired uses including normal personal use, recreational use, sport use and commercial use. Embodiments include applying structural design and material properties to provide a fixed or a variable set of performance characteristics. Similar to the fruits of other space program initiatives, the innovation leverages material science developed for extra-terrestrial purposes to accomplish advances over conventional items.

17 Claims, 5 Drawing Sheets

(56) References Cited

U.S. PATENT DOCUMENTS

| | | | |
|---|---|---|---|
| 6,250,355 B1 * | 6/2001 | Provitola | E04B 1/35 152/285 |
| 10,427,461 B1 * | 10/2019 | Padula, II | B60C 7/06 |
| 10,449,804 B1 * | 10/2019 | Padula, II | B60C 9/0007 |
| 2010/0300587 A1 * | 12/2010 | Benzing, II | B60B 9/06 152/16 |
| 2013/0306211 A1 * | 11/2013 | Kubeck | B60C 7/18 152/247 |

* cited by examiner

SHAPE MEMORY ALLOY (SMA) TUBULAR STRUCTURE

CROSS REFERENCE TO RELATED APPLICATION

This application claims the benefit of U.S. Provisional Patent Application Ser. No. 63/077,138 filed on Sep. 11, 2020. The subject matter of this earlier-filed application is hereby incorporated by reference in its entirety.

ORIGIN OF THE INVENTION

The present disclosure is based on work performed by employees of the United States Government and may be manufactured and used by or for the U.S. Government for Government purposes without the payment of any royalties thereon or therefore.

FIELD

The disclosed innovation generally relates to Shape Memory Alloy (SMA) manufactured components and more specifically to tire technology using SMA materials. More specifically, an aspect of the disclosed innovation relates to vehicle tires composing SMA materials.

BACKGROUND

The original pneumatic tire was developed in 1888 based on the observation that a flexible tire that conforms to the ground does not lose as much energy to vertical motion as a rigid wheel. There is a net energy savings when the tire contours to variations in topography as compared to simply driving over them. This feature also provides a smoother ride in a vehicle equipped with such a tire. However, because of their reliance on a constant air pressure, pneumatic tires suffer from efficiency loss due to pressure changes and are prone to going flat when punctured or otherwise damaged. More recently, various non-pneumatic tire concepts have been developed. These non-pneumatic tires are typically limited in their ability to conform to the terrain without damage.

Extraterrestrial development for non-pneumatic tires and wheel systems place a high degree of sophistication and expertise in resolving issues in which criticality of non-pneumatics were considered to be essential. Non-pneumatic tires in particular have been developed for the rigors of extraterrestrial and harsh environments. Additionally, even innovative non-pneumatic tires that may feature Shape Memory Alloy (SMA) materials have been created in certain configurations used attachment mechanisms with moderate to high complexity, and thus may not be suitable for applications envisioned by the present disclosure. Applications envisioned include tubular structures subject to extreme deformations such as tires, seals, couplers, and the like.

Though pneumatic tires on vehicles, including bicycles, are capable of supporting high loads and undergoing significant deformation to adapt to the terrain (which are important drivers of good ride performance and efficiency), by nature they embody two primary issues. Firstly, pneumatic tires are prone to a total loss of functionality due to a single-point failure. Single-point failures that lead to a total loss of functionality include valve malfunction, puncture, abrasion, material wear through, and the like. It is to be appreciated that extraterrestrial environments are especially unforgiving for such failures. On Earth, getting a flat tire can render the vehicle unusable or possibly even result in risk to occupants of the vehicle, and possibly bystanders. Secondly, the performance and efficiency of pneumatic tires are dependent on tire pressure. If a tire is under-inflated, it may result in higher rolling resistance and additional energy expenditure, or may even rise to a level of being a safety issue.

SUMMARY

The following presents a simplified summary of the innovation in order to provide a basic understanding of several aspects of the innovation. This summary is not an extensive overview of the innovation. It is not intended to identify key/critical elements of the innovation or to delineate the scope of the innovation. Its sole purpose is to present some concepts of the innovation in a simplified form as a prelude to the more detailed description presented later.

In an embodiment, a non-pneumatic structure may comprise a matrix of a plurality of layers of wires wherein a first layer comprises a full loop of a cross section of the structure distributed along the full circumference of the structure and a second layer forms an interlaced mesh along the surface of the structure. In an embodiment, the proper material characteristics are coupled to the correct geometric structure to provide a tire that does not need air (thus avoiding the concerns with pneumatic tires), while also providing the structural resiliency, obstacle envelopment, and impact handling characteristics that other pure non-pneumatic tires may not provide.

In an embodiment, Shape Memory Alloy (SMA) materials may include NiTi, NiTiX (where X is a ternary alloying addition such as Hf, Zr, Au, Ag, Pt, Pd, Fe, etc.), NiTiXY (where X and Y are ternary and quaternary alloying additions similar to above), Ag—Cd, Au—Cd, Cu—Al—Ni, Cu—Al—Mn, Cu—Al—Mn—$Y_2$ (where $Y_2$ is a quaternary alloying addition such as Sn, Ni, Ag, etc.), Cu—Sn, Cu—Zn, CuZn—$X_2$ (where $X_2$ is a ternary alloying addition such as Si, Al, Sn, etc.), Fe—Pt, Mn—Cu, Fe—Mn—Si, Co—Ni—Al, Co—Ni—Ga, Ni—Fe—Ga, Ti—Nb, ~-Ti alloys, or ternary alloys or quaternary alloys of the shape memory alloy. In an embodiment, the SMA is NiTi and its derivatives. The ternary or quaternary alloying additions may be any elemental additions that provide characteristic advantages to the properties.

An embodiment of an SMA tire is able to achieve the same effect of pneumatic tires without the concerns because of the unique superelastic nature of the SMA structures and materials. Each wire of the plurality of wires may be capable of undergoing up to 8% reversible strain (30× more than traditional metals) which then allows the full structure to take on excessive levels of deformation without damage. This effect cannot be created with traditional materials. The unique layering of the SMA wires also provides high torsional stiffness, which enables traversing of obstacles and minimizing energy loss.

Embodiments of tires may be configured to obtain desired tire performance characteristics through the use of material-structural coupling (including material selection). Embodiments of the innovation further provide ability to preset performance characteristics of the tire. For example, an embodied tire, formed of a tube made from a matrix of materials and twisting of the tube prior to fastening ends of the tube together to complete the form of the tire, may be fine-tuned to a variety of desired tire performance characteristics such as various inflation pressures of pneumatic tires. Thus, the embodied tire may achieve similar tire performance characteristics without the detriments of pneumatic tires.

In embodiments, controls may be provided such that the twist at the mating ends of a tube may be adjustable after installation on a wheel. In this manner, a range of embodiments of the tire may include application of various forms of material-structural coupling that yield a configurable design. In this way, the variable set of tire performance characteristics can be adaptively adjusted or pre-selected and fixed, depending on the desired use requirements in the application.

BRIEF DESCRIPTION OF THE DRAWINGS

In order that the advantages of certain embodiments of the disclosed innovation will be readily understood, a more particular description of the disclosed innovation briefly described above will be rendered by reference to specific embodiments that are illustrated in the appended drawings. While it should be understood that these drawings depict only typical embodiments of the disclosed innovation and are not therefore to be considered to be limiting of its scope, the disclosed innovation will be described and explained with additional specificity and detail through the use of the accompanying drawings, in which.

DETAILED DESCRIPTION OF THE EMBODIMENTS

The disclosed innovation now will be described more fully hereinafter along with various embodiments and with reference to the accompanying drawings. The disclosed innovation may, however, be embodied in many different forms, and should not be construed as limited to the embodiments set forth herein. Rather, these embodiments are provided so that this disclosure will be thorough and complete, and will fully convey the scope of the disclosed innovation to those skilled in the art. Like reference numerals refer to like elements throughout.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Maintaining proper tire pressure in pneumatic tires may require elimination of leak paths and the maintenance of the tire for prevention of leak paths over time, incurring secondary costs of maintenance equipment and personnel. In some cases, such as in aircraft or truck fleets, these expenses are well beyond nominal. In other cases, such as in bicycles, inconvenience and safety as well as loss of performance in certain specialty bicycle domains may still be of significant concern. It is to be appreciated that while there are other non-pneumatic bicycle tires on the market (for example, tires of carbon fiber), these may not provide the same level of performance, for example, in relation to interactions with a terrain that a vehicle with tires may encounter, that pneumatic tires may provide. Various factors related to performance may be deemed important for durability and for comfort as small impacts may be absorbed by the tire and not felt by the vehicle, (or the occupants) especially for vehicles such as a bicycle that typically may lack a suspension system.

In other words, there may be a host of issues pertaining to the conventional pneumatic tire concept in the sense that such tires can be punctured or have other failure issues. For such tires, it is imperative to maintain air pressure for functionality. Such conventional systems may have leak paths that reduce the internal pressure of the system and therefore change performance over time or drastically in the event of a failure. An important performance metric in such sectors as for example, the automotive, truck, or aircraft sectors, is related to efficiency over time in terms of fuel consumption and other items such as maintenance and safety checks. In conventional tires, when loss of air pressure occurs, a larger contact patch is created and an increase in rolling resistance may be observed. For a bicycle, such increased rolling resistance translates to a rider expending more energy to continue motion of the vehicle. In addition to bicycles, it is to be appreciated that tires for other types of vehicles may also see application of the disclosed innovation, such as, but not limited to, various trucking vehicles, aircraft landing gear, military ground vehicles, agricultural/landscaping vehicles and other off-road vehicles.

Extraterrestrial development for non-pneumatic tires and wheel systems place a high degree of sophistication and expertise in resolving issues in which criticality of non-pneumatics were considered to be essential. The history of innovation has many storied moments that stem from some initial work by the National Aeronautics and Space Administration (herein NASA) to engender new innovation with application of the extraterrestrial efforts of one thrust to new efforts concerning more terrestrial matters. The present innovation provides such a cross-over and may be understood with reference to precursor efforts that resulted in other innovations.

For example, work done with NASA yielded U.S. Pat. No. 8,141,606 for a spring tire that reduced or eliminated a need for air in tires. In that innovation, inspiration from the Apollo moon program on lunar wire-mesh tires provided new non-pneumatic tires of springs woven into a flexible mesh designed for a specific load range. It is to be appreciated that non-pneumatic tire designs that use conventional materials may be limited in the loads that can be imparted without incurring permanent deformation. The concept uses coiled spring steel wires woven into a flexible mesh to enable the tire carcass to deflect, thereby isolating the vehicle from motion and increasing net traction potential. These elastic materials only tolerate a maximum of 0.4% strain before plastically deforming and permanently changing the tire shape.

Concerns for other planetary rovers introduced an evolution, as may be seen in the innovation provided in U.S. Pat. No. 10,449,804 for a superelastic spring tire. Meeting a wide range of extraterrestrial environmental and performance goals indicated development of tires not requiring air or rubber tread. Certain advances were made with novel application of shape memory alloy (herein SMA) materials to tire constructs that provided unique tire geometries and broadened applicability over wider range of design parameters, while providing tractive performance without the use of rubber tread (rubber is not suitable for most extraterrestrial applications). For example, the ability of spring tires to allow full reversibility after carcass distortion was extended. In addition, tire designs in general may restrict a speed at which vehicles can travel off-road or in difficult terrains, because higher speeds may impart excessive force to the vehicle during high deformation impacts. Spring Tires made from SMA overcome the issues associated with permanent deformation and high launch forces but, due to the structural nature of the individual elements, may not be optimal for high load carrying applications.

Further extended evolution as may be seen in related U.S. Pat. No. 10,427,461 for a SMA radially stiffened tire that provided use of radial components rather than springs to allow higher load-to-weight performance for even greater range of loads, sizes, geometries. It is to be appreciated that allowing for decoupling of multiple design parameters such as for example multi-direction stiffness and traction provided for improved design flexibility and allows for easier integration with rubber tread for terrestrial applications. Each of U.S. Pat. Nos. 8,141,606, 10,449,804 and 10,427,461 are hereby incorporated in its entirety.

In an embodiment, a tire may be comprised of a plurality of SMA materials instead of traditional elastic-plastic materials as load carrying members. This change may result in increased deformation without permanent damage, and may enable vehicles to travel at faster speeds without excessive impact force on the vehicle, even while traveling over difficult terrain. Thus, aspects of the innovation improve the viability of non-pneumatic tires as an alternative to pneumatic tires.

Aspects of the disclosed innovation may overcome a number of design limitations associated with spring tires, including SMA spring tires, as well as other non-pneumatic tires, and may significantly improve design flexibility and load-carrying capabilities of embodied tires. It is to be appreciated that aspects of the innovation allow for both more design flexibility as well as improved manufacturability while taking advantage of the strain capability associated with SMA materials. It is to be further appreciated that SMA elements may also be designed with varying degrees of hardening character allowing different spring rates to be achieved within the same design. The ability to tailor this spring rate and, thus, force response optimizes performance while simultaneously protecting a vehicle equipped with embodiments of the innovation from damage.

SMA are a class of materials that are not limited to elastic deformation in the design. SMA undergo a solid-state phase transformation (an inelastic process that happens to be reversible) that allows the SMA to receive up to 8-12% strain before initiating irrecoverable, plastic deformation. The increased strain capability of the SMA material translates to an increase in reversible deformation of the tire that approaches more than 30 times the deformation that can be achieved compared to a spring tire designed with conventional metals. SMA materials can enable geometries that embody a structure with higher load carrying capacity per unit of mass (i.e. greater coil pitch, smaller coil diameter, and/or greater wire diameter). These spring geometries increase the load carrying capacity and reduce the amount of material required to make the spring.

Additionally, SMA materials can reduce structural mass though reduced spring material density. For example the density of a common SMA, NiTi, is ⅔ the density of steel, a conventional material. Spring tires with SMAs are capable of carrying heavier loads at a lower overall weight without undergoing permanent deformation due to their increased strain capability. In other embodiments, pseudoelasticity/superelasticity designed SMA tires have the ability to carry much higher loads and exhibit a more mechanically reversible design construct.

It is to be appreciated that use of superelastic shape memory alloy structures provide a tire that may mimic the performance of a traditional bicycle tire without the need for air. Generally, at least two major issues that may exist with pneumatic bicycle tires are 1) risk of puncture causing a flat tire (can cause physical harm to rider or at the least, require replacing a tube, or taking the time and effort to patch the failure) and 2) loss of tire pressure over time (reduces efficiency and performance). The disclosed innovation serves to eliminate both of these issues and still provide the ride comfort and performance of traditional tires. Additional benefits may include a degree of customizing across different rider sets that conventional pneumatic tires cannot satisfy, since such conventional tires must sacrifice elements of comfort and performance for vehicles tuned to specific adventures. For example, conventional tires for various forms of pleasure or sport riding, including off-road mountain biking and speed racing are known in the art to be driven by specific comfort and performance trade-offs that vary substantially from the trade-offs that would be involved with long distance on-pavement endurance riding or short distance on-pavement speed riding. It is to be appreciated that embodiments of the innovation also open up the option to redesign vehicle wheel and braking systems since containing air is no longer a requirement.

Figure 1:
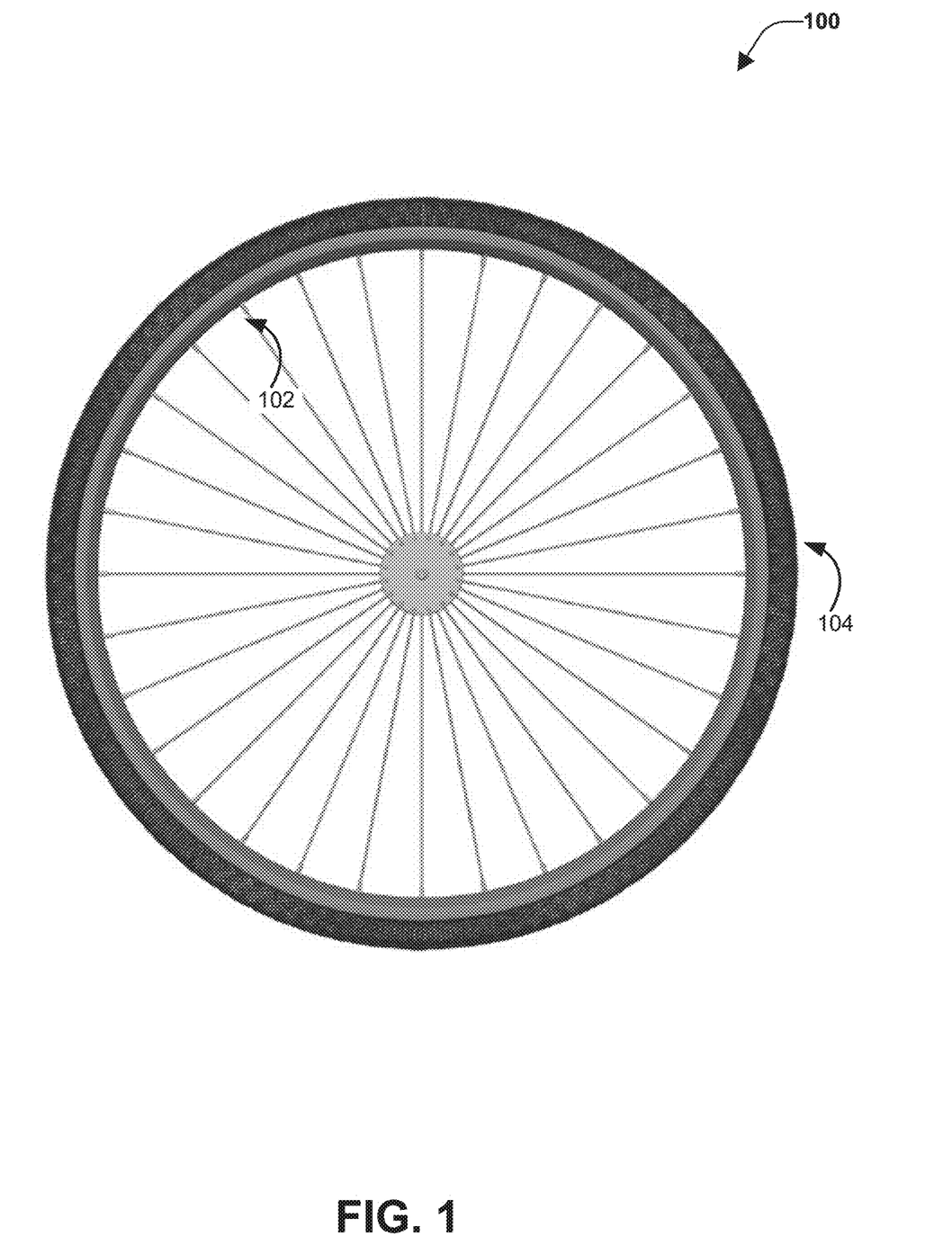
FIG. 1 is an embodiment of a prototype wheel.

Turning to FIG. 1, an embodiment presents an embodiment of a unique non-pneumatic vehicle tire 100 capable of performing similarly to traditional pneumatic tires but with no risk of puncture or loss of tire pressure. An embodiment of the innovation may consist of two layers of superelastic shape memory alloy (SMA) wires formed into the shape of a tire. It is to be appreciated that an embodiment provides that the tire may be mounted to an off-the-shelf road bicycle rim 102.

In an aspect, consideration of material characteristics as well as physical dimensions of wires used to form layers in the fabrication of a structure provides a configuration of the innovation. For example, holding constant an SMA wire diameter, but reducing a hoop diameter that such a wire forms, may yield a hoop with greater configuration stiffness. Additionally or alternatively, one may change not only a physical architecture of the structure but the pre-loading of the material of that structure to obtain a desired range of metrics by modifying selected characteristics of the material in a matrix of wires. It is to be appreciated that other characteristics that could be modified include wire diameter, hoop spacing and the like. In an embodiment, a hoop layer may be formed by a sinusoidal plurality of wires with chosen pitch, spacing and the like. Combinations are also envisioned. Advancing from a half circle hoop, as has been innovated in the aforementioned patents, an aspect of the innovation provides a matrix of a plurality of layers to be configured into a completed and self-contained structure, such as a tube. Such a tube may sit in a rim, thereby avoiding attachment complexity to a rim or wheel that prior 'half-hoop' methodologies led to. It is to be appreciated that other cross-sectional shapes may be fabricated, including detailed varied structure at an outer-most radial construction such as may replicate a tire pattern. Further, a layer of the matrix may be fashioned in a braid, mesh, or weave, or may be elements themselves that are fashioned as springs in order to leverage mechanical characteristics of springs.

In other words, applying material choices and geometric coupling may provide a physical construct advancing from prior tire designs. With a reduction of a selected geometric parameter in relation to other geometric parameters, coupled with material choices, a tire construct can be selected that may yield advantages of replacing pneumatic tires. Geometric design consideration may be viewed in the following example embodiment for discussion purposes. One may view a hoop of a certain size. Wire material having a wire diameter may be formed into a layer of a hoop. The wire material may be of a spring that makes that hoop kept constant in this example, or may be a sinusoidal construct having a loop of a cross section of the tire. A coil diameter or hoop diameter relative to the wire diameter dictates what may be considered to be a spring index for a stiffness or rigidity of the structure. One may imagine a hoop of several feet in diameter with one one-thousandth inch wire, the structure may be really flimsy. But if one considers the wire diameter to be several orders of magnitude thicker, the construct may be appreciably stiffer. Alterations to the geometric index, or ratio between the hoop diameter and wire diameter, may dictate how much load a construct may handle. In the embodiment example being discussed, one may fix the wire diameter to 50 mil.

Figure 2A:
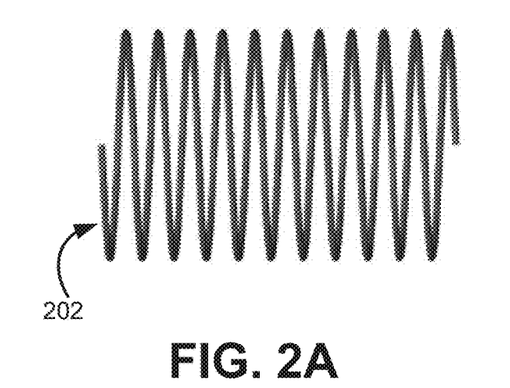
FIGS. 2A-2D provide views highlighting multiple layers of SMA material in an embodiment.
Figure 2B:
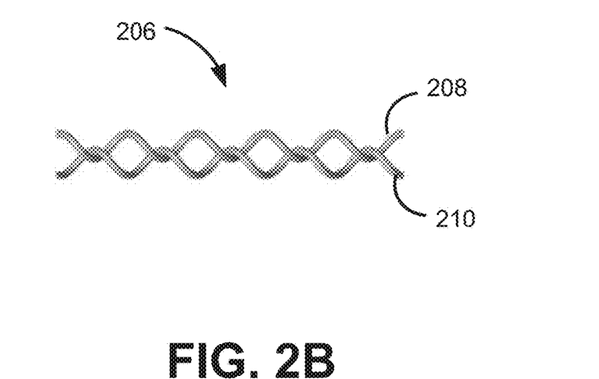
Figure 2C:
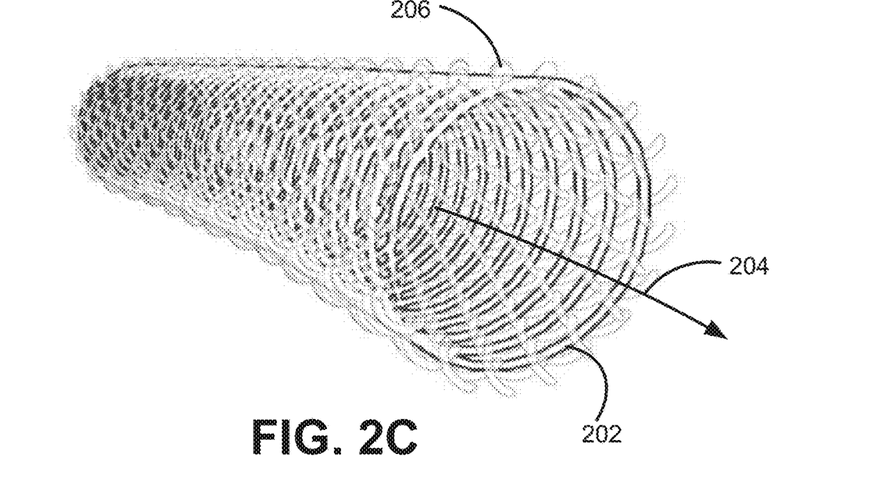

As disclosed in the incorporated patents, prior innovation featured designs of a particular desired hoop diameter with wire diameter that dictated that a complete hoop alone did not have sufficient desired stiffness, and thus required configuring a partial arch with support being generated by a rim or wheel outside of the SMA material. It is to be appreciated that the present innovation reduces a diameter of a hoop, controlling various curvatures involved and making use of a geometric index between a circular hoop and wire size being changed, thereby obtaining a structure that can carry much more load. In common parlance, looking at a cross section of a tire as shown in FIG. 1, a hoop at the tire area 104 of the wheel would look like a full circle, as a section of a tube would look. Turning to FIGS. 2A-C, it is to be appreciated that this hoop, may not be single wire in the plane of the cross section, but that this layer making up a hoop structure may be a sinusoidal wire 202 helically wrapped about an axis 204 of a tube.

It is to be appreciated that selection of wire size is only one option that may be modified to effect a geometric coupling in the innovation as disclosed. Alternative embodiments may tailor numerous aspects of the geometry used including wire size, coil size, pitch, hoop shape and over-all structural construction (i.e. the means in which various components are woven together). Thus, the disclosed innovation provides that numerous variables may be selectably adjusted, including pre-stressing of the material and/or global structure, to provide final configurations in a different way that could not be obtained with the other tire technology.

Figure 2D:
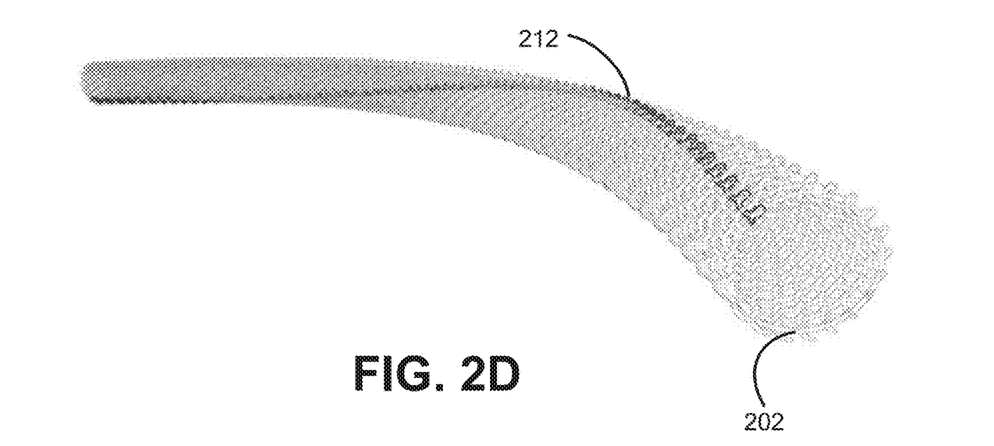

Turning to FIG. 2B, an example of a second layer 206 is portrayed. The second layer is shown as interweaving one wire 208 of the second layer with an adjacent wire 210. FIG. 2C portrays a matrix of interlaced first layer (hoop layer) and the second layer. This matrix of layers may serve the purpose of setting the overall tire geometry as well as providing strength in the radial and circumferential directions (relative to the overall tire orientation). As seen in FIG. 2D, a second layer may consist of other SMA wires (for example, wires as springs 212) interlocked with each other as well as the first layer 202. It is to be appreciated that for clarity's sake, one such item is shown bold, while other such items are shown lightened in the figure. It is also to be appreciated that each SMA wire may be interlaced with an adjacent SMA wire on a first side of the SMA wire and further being interlaced with an adjacent SMA wire on a second opposite side of the SMA wire thereby forming a toroidal structure extending about the desired configuration (in concert with the first layer).

For example, as mentioned above, an embodiment may provide a hoop structure in cross section of a full circle of a helical spring and one may provide a pre-twist prior to forming or connecting the two ends to produce the hoop. One may employ design consideration in selecting a value for the pre-torsion, and then proceed with joining the tube ends together. In an alternative embodiment, a tube may be configured to be seamless. In other words, the layering of a matrix, with a first layer providing a hoop structure and a second layer providing a 'surface' to the hoop, may be fabricated by interlacing the second layer in stages (for example, by weaving elements of the second layer to have varying end points) such that an 'endless' torus is created. Torsion may be applied either or both during this process or subsequent to the formation of the endless torus. See FIG. 2D to see how a twist in a wire of a second layer may be shown. It is to be appreciated that endless torus may in effect be equivalent in structure to a joined-end tube as shown in FIG. 1.

Figure 3A:
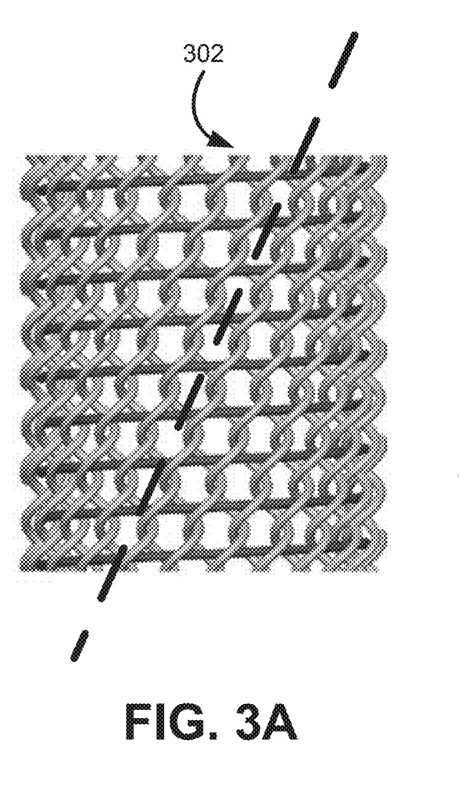
FIGS. 3A-B provide section views of an embodiment displaying an applied level of torsion.
Figure 3B:
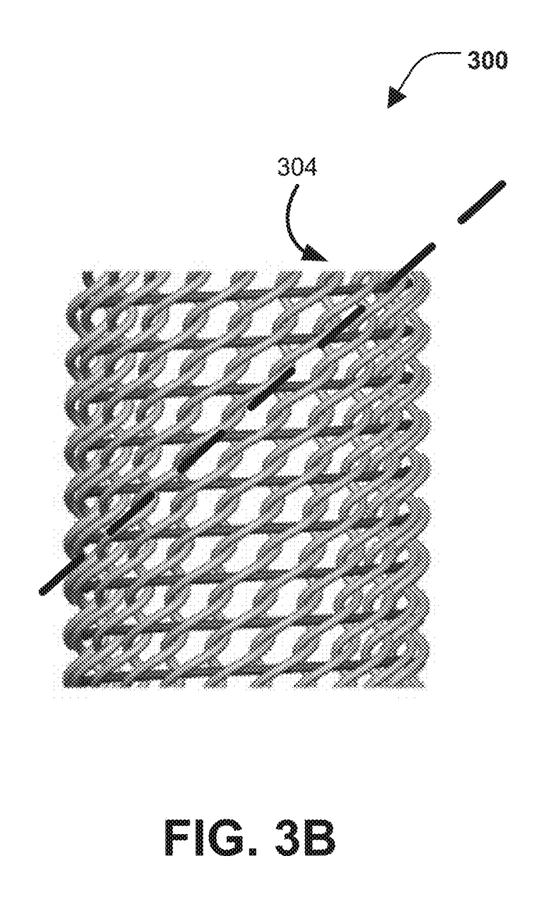

Turning briefly to FIGS. 3A-B, a combined matrix 300 is shown. In an embodiment this may be thought of as a sheath or tube. It is to be appreciated that a variety of design variables may be selected from among the wire thickness and spacing of each of the layers of the matrix of the SMA materials. For example, a purpose of setting a coil spacing for the first coil, as well as providing a desired shear stiffness may be obtained with selected variables of the construction. It is also to be appreciated that to assist in generating a desired shear strength, the entire 2-layer structure may be twisted, and creating a boundary condition that locks the two layers together and limits movement between elements. Torsion may be applied along the axis of the tube, as well as twisting the tube into the net shape of a tire. FIG. 3A displays a view of a matrix of a plurality of layers of wires including a layer comprising a loop (darker wire), and a layer creating a surface of a tube (lighter wire) in a pre-torsion state 302. FIG. 3B displays the same matrix with an applied level of torsion to the matrix and is illustrated in a torsioned-state 304.

In other words, an embodiment provides a completely new structural pattern; the tire comprises two layers of SMA elements. A layer that is a part of a matrix may be a single wire shape-set into a coil and wrapped circumferentially (after integrating with a second layer of the matrix) into the shape of the tire to be joined to a wheel. This may serve the purpose of setting an overall tire geometry as well as providing strength in the radial and circumferential directions (relative to the overall tire orientation). The secondary layer may consist of smaller SMA wires interlocked with each other as well as the primary SMA coil, acting as a sheath and serving a purpose of setting the coil spacing for the primary coil, as well as providing shear stiffness. It is to be appreciated that wires may be in the form of springs. It is also to be appreciated that to generate shear strength, the entire 2-layer matrix structure may be twisted, creating a boundary condition that locks the two layers together and limits movement between elements as discussed in relation to FIGS. 3A-B. It is to be further appreciated that the superelastic nature of SMA material provides the capability of forming such a configuration. Such material can take up to a range of 8-12% effective reversible strain, whereas traditional metals would not be able to maintain these shapes without yielding.

As one example, three basic steps may be utilized to manufacture an embodiment of an SMA tire: i) interlacing SMA material (in various shapes, for example, as springs) together to form a rectangular sheet with a length corresponding to the desired tire circumference; ii) interlacing the rectangular sheet of springs with a first layer of coil to form a mesh cylinder; iii) wrap the cylinder ends so that they meet and form a toroidal structure (the tire). It is to be appreciated that a variety of elements of the design may be adjusted prior to manufacture, and in some embodiments, may be selectably altered after manufacture. In an embodiment (not shown), torsion may be applied to the tube prior to joining, after joining, or both for a provided construct. It is to be appreciated that as discussed herein, another example of basic steps may be adjusted such that instead of a step i) being a fixed rectangular sheet, wires of a determined length may be interlaced into a hoop layer at varying points, thereby creating a seamless torus.

Figure 4A:
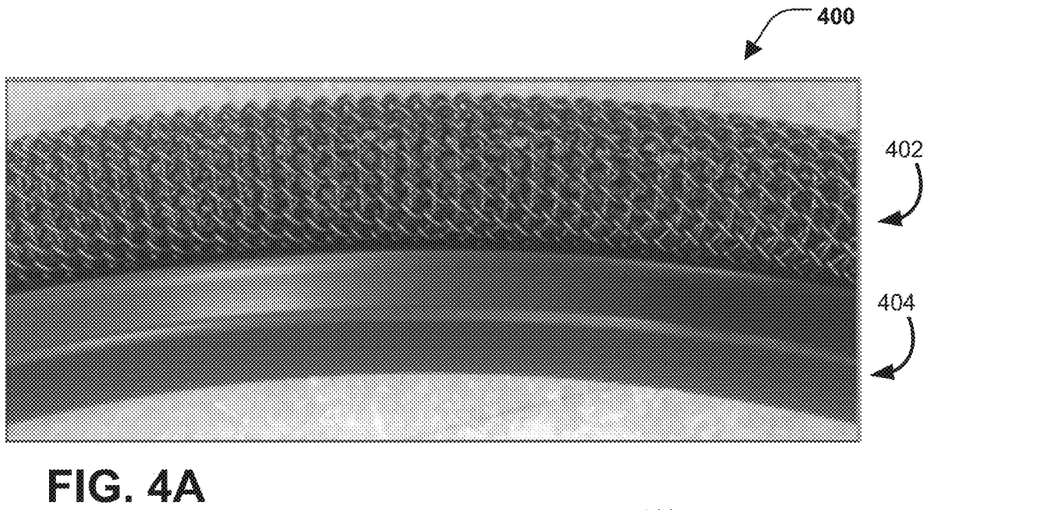
FIGS. 4A-B provides views of an embodiment of a SMA bicycle tire with and without tread.
Figure 4B:
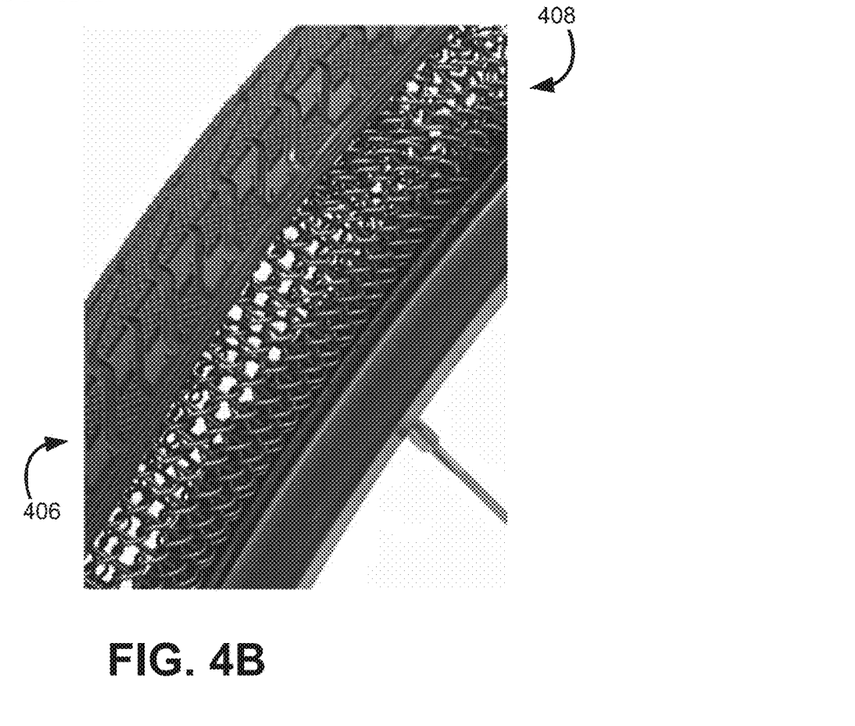

Turning to FIG. 4A, an example embodiment 400 is shown as a tube 402 placed in a conventional wheel rim 404. FIG. 4B shows an embodiment with a layer of tread 406 disposed on the radially outward portion of the tire 408, that is, attached along the crown of the tire. The SMA components serve to eliminate the need for air. It is to be appreciated that a tread surface may still be desired in order to generate sufficient traction on a variety of terrain. A further benefit of the innovation is that any tread (typically rubber, and depending on the application, high quality expensive rubber) may only need to cover the contact patch of the tire, as no inner tube or outer covering would be required to maintain air pressure of a pneumatic tire. The tread surface may be tailored to specific applications and may even be designed to be easily replaceable.

Figure 5A:
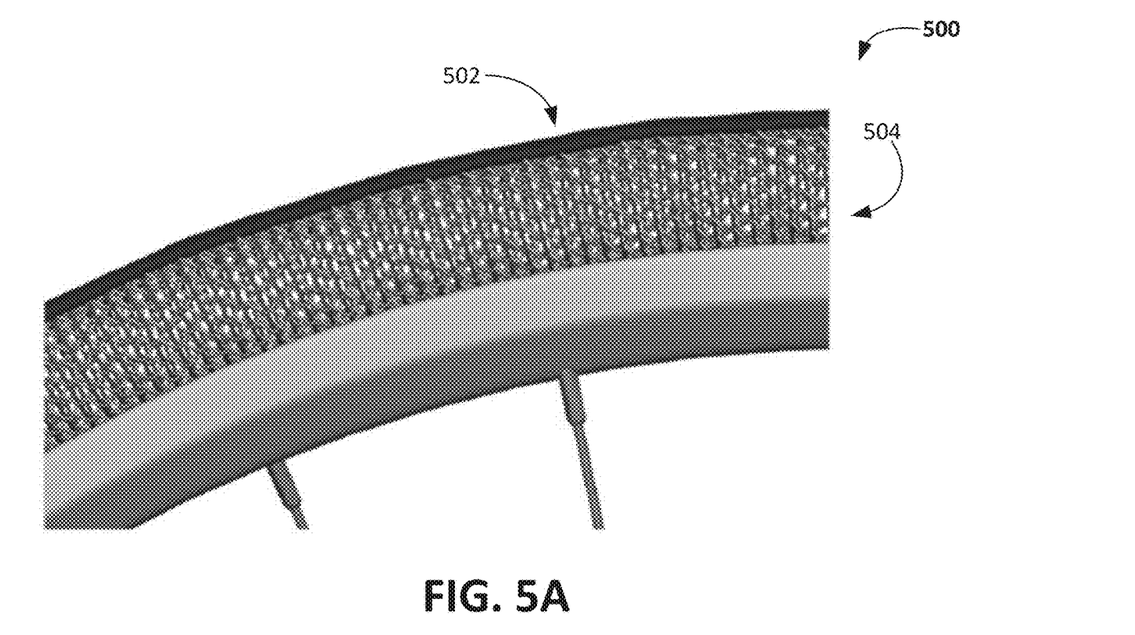
FIGS. 5A-B provide views of an additional embodiment of a SMA bicycle tire with tread.
Figure 5B:
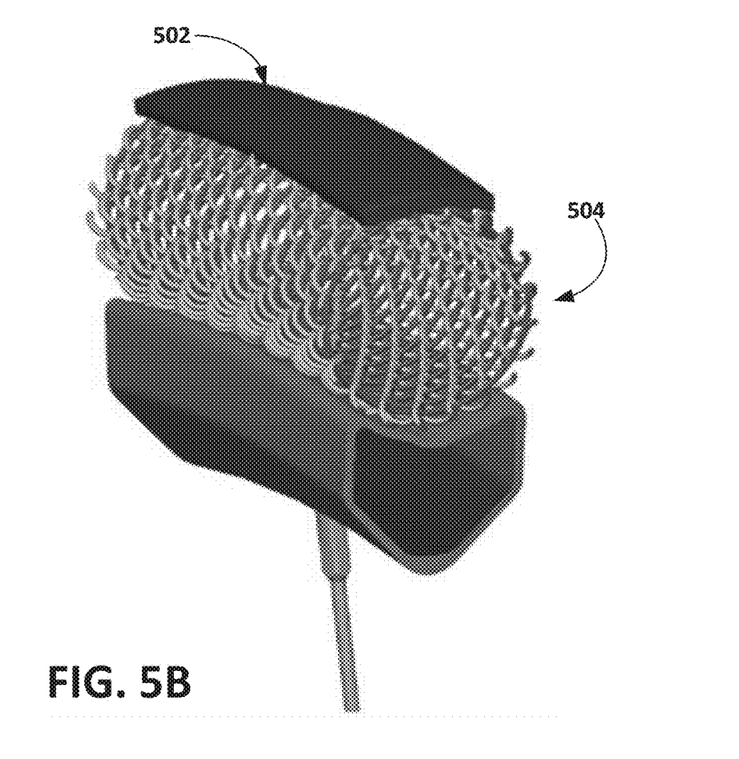

FIGS. 5A and 5B provide additional views of an embodiment 500 with a layer of outer tread 502 disposed on an SMA structure 504. The outer tread may be replaceable. It is to be appreciated that as the innovation no longer requires a coating such as the outer tread to fully (or partially, with an exception of a rim area) encapsulate an inner tube, the selection and application of the tread may utilize various trade-offs for similar performance at lower cost, or increased performance at a same cost. For example, choosing to have the outer tread reflect a conventional material tread in material choice, design choice (i.e., thickness) or both, a lower cost tread ensues. A different choice may be to upgrade the tread (again, in material choice, design choice, or both) to a level of the prior cost of a full or more thoroughly covered tire.

Returning to FIGS. 3A-B, it is to be appreciated that the disclosed innovation provides that one may select most any equivalent specialty pneumatic tire type, and arrive at an equivalent performance characteristic that may be desired by changing the wire material, geometric coupling, or both with the index of the tires embodying the innovation. It is to be appreciated that torsion may be considered "pre-torsion" for an applied level of torsion being applied at different stages of a manufacture of a tire, and for embodiments in which selected performance characteristics are set, applied levels of torsion may be applied prior to the formation of a completed torus. For embodiments in which selected performance characteristics may be variable, applied levels of torsion may be applied prior to formation of a completed torus, as well as after formation. By differing amounts of pre-torsion, performance of the tire may be tuned or altered.

For example, a starting pre-torsion may provide a tie with high stiffness and adjusting the torsion may "soften" and lower stiffness. Performance of a given tire may be tailored. For example, performance may be tailored between what a mountain biker might want for soft sand in comparison to what a road cyclist might want for hard pavement, without replacing any of the parts. With an embodiment that provides adjustability, for example, a control for operation to change torsion properties of the inner structure or the tire, a cyclist may in effect change the performance of the same wheel set with no change as may be required in a pneumatic tire situation, such as changing of tubes, or altering pressure with air release, and then pumping air back into the pneumatic tube. An embodiment of the innovation may provide, similar as to a mechanism of gear changing for gears, a setting for tire control that provides a selection from a range from, for example, mountain bike mode to street pavement mode to racing mode. In another example, weather conditions may provide a desire to change tire operating characteristics. In rain or snow, for example one may desire to decrease an equivalent tire pressure to obtain more contact of the tire surface with road surface. Having the ability to change the stiffness provides an ability to change an equivalent to a tire's air pressure without requiring a pump (to reverse an action of lowering air pressure by letting air out of a pneumatic inner tube). Structural metrics may be changed on the fly without deflating and inflating pneumatic tires. Such an embodiment may provide a tire for multi-terrain racing for cyclists doing a lot of climbing on rocky terrain, soft sandy terrain, to hard pavement. There is no inflation or deflation of a pneumatic tire's air pressure because the innovation provides control through the structure and that structure is not a pneumatic-based construct.

Conventional leisure riding may have a typical pneumatic tire inflation somewhere between 35 PSI and 50 PSI. A road cyclist, for example a racer in the Tour de France, may prefer an inflation range between 100 to 120 PSI. For a mountain biker going into sandy soil, a desired inflation may be lowered to approximately 20 PSI. Embodiments of the innovation may provide a range of performance characteristics to cover all of these equivalent pneumatic inflation levels with one set of tires. The adjustable range for most equivalent tire pressures that could be used for a bike encompasses from about 10 PSI to what would be the equivalent of about 200 PSI. It is to be appreciated that by eliminating traditional failure modes of pneumatic tires with aspects of the innovation providing durability, adjustability, or both, one may never have to change a bicycle tire and enjoy maintenance free use.

Performance characteristics, like a tire parameter such as equivalent pneumatic inflation level, may be adjusted by a level of applied torsion. Control of a level of applied torsion may be applied by way of a controller (not shown). A controller may employ digital or physical controls, and may be integrated into the area of the tube ends at their point of joining, or may be dispersed in an embodiment of a seamless tube. It is to be appreciated that a wide variety of applying a control of torsion is envisioned, and that the innovation operates through the applied level by virtue of the prior selected materials and designed geometric coupling. Additional performance characteristics include selected load, deflection response of a structure, such as the tire described herein, and the like.

While not shown, it is to be appreciated that embodiments of the innovation may include a variety of levels of integration of the tire structure into the wheel assembly. For example, a simple level of integration may be viewed as the tire being used as a simple replacement of a conventional pneumatic tube of a conventional wheel. Further solutions with aspects of the innovation may include replacing an additional conventional wheel system component with embodiments of innovative structure. For example, an embodiment (not shown) may be formed such that the tube is not purely a smooth torus, but may be formed to have traction features on an outer periphery. For another example, an inner periphery (not shown) may be formed such that a conventional rim of a tire need not be present, with the tire mating integrated.

Additionally, it is to be appreciated that while many aspects of the innovation have been discussed in terms of replacing a pneumatic tire such as may be found in a bicycle, embodiments of the innovation are envisioned in other vehicle sectors. For example, tires for an aircraft sector may have substantial maintenance concerns with conventional tires. Not having to have safety maintenance features on an aircraft system, that is, the equipment and personnel hours involved in a Tire Pressure System (TPS) may involve hundreds of pounds per aircraft, and then require maintenance personnel to check, re-inflate as necessary, and the like. Safety concerns due directly to the pneumatic nature of tires induce costly requirements. An aspect of the innovation may be able to remove that because there is nothing related to a pressure level to check. Such an aspect provides a structural performance metric. There are potential system level benefits as well from aspects of the innovation. Because the tires do not require air, there is a potential to redesign the vehicle wheels and braking systems since the wheels themselves do not need to carry the function of preventing air from escaping.

Benefits of the innovation may be realized in a number of ways related to lighter weight of a wheel assembly. Lighter weight may be provided as an overall construct may no longer require the tire structure to be completely encapsulated in rubber. Rubber that would have been used may be reallocated, such as be put onto an existing wheel set or have rubber on only the portion of the tread that comes in contact with the ground. Less rubber use also has a beneficial ecology outcome in that lower landfill rates may be obtained in lower discard volume when people replace separable tread sets and throw the used tread sets away. It is to be appreciated that another aspect of the innovation derives from a decreased application of rubber for tread purposes. Not only may such drive towards lower weight of a tire, but higher grade (and lower volume) material may become an economical option in outfitting vehicle tires across a spectrum of sectors. It is to be further appreciated that lighter weight may provide additional benefits. Lighter weight means less rotating inertia which means more efficiency. Many other benefits not obtainable with conventional systems may be provided with no cost to performance. For example, physical strain and effort provided by a rider may be mitigated or lowered based on the lighter weight without sacrificing other tire performance characteristics.

It is to be appreciated that the benefits to various sectors may be realized with various embodiments. For example, in a commercial truck sector, economies of rubber type and usage may be optimized. One may consider the amounts and types of rubber one may normally use for conventional pneumatics and provide substantial reductions in use. Material cost savings may make available design trade off considerations of higher grade rubber at the reduced traction zones compared to the tread area making contact with the road. In these zones, tread for contact areas may be made thicker, yielding longer life for the tire since more material is available for wear before the tread section reaches minimum tread-depth required for replacement, even for similar material wear rates to previous constructs. Similar considerations for other sectors may apply. For example, commuter bicycle tires, as a need for sidewalls encapsulating air have been removed, thicker tread elements may still yield lighter weight tires with performance (longevity) improvement.

Returning briefly to FIG. 1, the embodiment of a prototype, ease of applying a liquid rubber coating (commercially available "Plasti Dip") was established. The rubber coating was applied to the crown of the tire in order to provide surface friction, in this case, purely for the sake of demonstrating the tire potential. It is to be appreciated that a variety of coatings or encapsulations, such as materials used in the commercial tire industry, may be utilized to promote selected wear and grip properties.

Furthermore, while embodiments herein have been described using a tire, additional SMA structures are possible. For example, traditional polymer seals may be replaced with superelastic SMA structures. In some applications a polymer seal may be replaced with a compliant tubular structure that allows for extreme deformations. The compliant tubular structure may comprise a matrix of a plurality of layers of wires including a first layer and a second layer that interlaces with the first layer to create a surface of the tubular structure. The layers of the compliant tubular structure may be formed using an SMA having an austenite crystal structure in an ambient condition, and during an application of an externally applied force upon the structure, the austenite crystal structure of the SMA reorients to a martensitic crystal structure to minimize internal strain energy and decrease local stiffness that accommodate load and large deflection of the SMA.

Additional embodiments include grips/couplers to be used between two structures. For example, a cylindrical, helically wound braid may be formed using a plurality of layers of wires comprising an SMA having an austenite crystal structure in an ambient condition, and during an application of an externally applied force upon the structure, the austenite crystal structure of the SMA reorients to a martensitic crystal structure to minimize internal strain energy and decrease local stiffness that accommodate load and large deflection of the SMA. The superelastic SMA grips/couplers may be used for new applications that require strength and deformation that existing polymer or traditional wire grips/couplers cannot accommodate.

One having ordinary skill in the art will readily understand that the disclosed innovation as discussed above may be practiced with steps in a different order, and/or with hardware elements in configurations which are different than those which are disclosed. Therefore, although the disclosed innovation has been described based upon these preferred embodiments, it would be apparent to those of skill in the art that certain modifications, variations, and alternative constructions would be apparent, while remaining within the spirit and scope of the invention. It will be readily understood that the components of various embodiments of the disclosed innovation, as generally described and illustrated in the figures herein, may be arranged and designed in a wide variety of different configurations. Thus, the detailed description of the embodiments, as represented in the attached figures, is not intended to limit the scope of the invention as claimed but is merely representative of selected embodiments of the disclosed innovation.

The features, structures, or characteristics of the disclosed innovation described throughout this specification may be combined in any suitable manner in one or more embodiments. For example, reference throughout this specification to "certain embodiments," "some embodiments," or similar language means that a particular feature, structure, or characteristic described in connection with the embodiment is included in at least one embodiment of the disclosed innovation. Thus, appearances of the phrases "in certain embodiments," "in some embodiment," "in other embodiments," or similar language throughout this specification do not necessarily all refer to the same group of embodiments and the described features, structures, or characteristics may be combined in any suitable manner in one or more embodiments.

It should be noted that reference throughout this specification to features, advantages, or similar language does not imply that all of the features and advantages that may be realized with the disclosed innovation should be or are in any single embodiment of the innovation. Rather, language referring to the features and advantages is understood to mean that a specific feature, advantage, or characteristic described in connection with an embodiment is included in at least one embodiment of the disclosed innovation. Thus, discussion of the features and advantages, and similar language, throughout this specification may, but do not necessarily, refer to the same embodiment.

Furthermore, the described features, advantages, and characteristics of the disclosed innovation may be combined in any suitable manner in one or more embodiments. One skilled in the relevant art will recognize that the disclosed innovation can be practiced without one or more of the specific features or advantages of a particular embodiment. In other instances, additional features and advantages may be recognized in certain embodiments that may not be present in all embodiments of the invention.

What is claimed is:

1. A non-pneumatic structure comprising:
a matrix of a plurality of layers of wires,
wherein a first layer comprises a loop of a cross section of the structure, forming a tube, the tube having an axis, and a second layer that interlaces with the first layer to create a surface of the tube;
wherein the tube ends are mated together to form a torus, wherein an applied level of torsion to the matrix along the axis of the tube yields a selected set of performance characteristics; and
wherein the plurality of layers of wires comprise a shape memory alloy (SMA) having an austenite crystal structure in an ambient condition, and during an application of an externally applied force upon the structure, the austenite crystal structure of the SMA reorients to a martensitic crystal structure to minimize internal strain energy and decrease local stiffness that accommodate load and large deflection of the SMA.

2. The non-pneumatic structure of claim 1, wherein the first layer of the matrix is formed from one or more of a set of individual hoops or a strand that sinusoidally winds around the tube axis.

3. The non-pneumatic structure of claim 1, wherein the second layer of the matrix is formed from one or more of a braid, mesh or weave.

4. The non-pneumatic structure of claim 1, wherein the SMA is one of alloys, ternary or quaternary alloys of NiTi, NiTiX, NiTiXY, Ag—Cd, Au—Cd, Cu—Al—Ni, Cu—Al—Mn, Cu—Al—Mn—$Y_2$ where $Y_2$ is a quaternary alloying addition, Cu—Sn, Cu—Zn, CuZn—$X_2$, Fe—Pt, Mn—Cu, Fe—Mn—Si, Co—Ni—Al, Co—Ni—Ga, Ni—Fe—Ga, Ti—Nb, and ~-Ti.

5. The non-pneumatic structure of claim 4, wherein X and $X_2$ are ternary alloying additions, and Y and $Y_2$ is a quaternary alloying addition.

6. The non-pneumatic structure of claim 5, wherein X and Y comprise one or more of Hf, Zr, Au, Ag, Pt, Pd, and Fe, $X_2$ comprises one or more of Si, Al, and Sn, and $Y_2$ comprises one or more of Sn, Ni, Ag, etc.

7. The non-pneumatic structure of claim 1, wherein the selected set of performance characteristics comprise a selected load/deflection response based at least in part on applied material-structural coupling, and at least in part in material processing of the wires.

8. The non-pneumatic structure of claim 7, wherein the tube is formed to be seamless.

9. The non-pneumatic structure of claim 1, wherein the selected set of performance characteristics is fixed.

10. A non-pneumatic tire comprising:
a tube comprising:
a first set of wires that comprises a loop of a cross section of the tire along the axis of the tube; and
a second set of wires that forms an interlaced mesh along the surface of the tube;
wherein the tube is conformed into a torus shape; and
wherein a selected number of wires of the first set and the second set comprise a shape memory alloy (SMA) having an austenite crystal structure in an ambient condition, and during the application of an externally applied force upon the SMA, the austenite crystal structure of the SMA reorients to a martensitic crystal structure to minimize internal strain energy and decrease local stiffness to accommodate load and deflection of the SMA, and wherein an applied level of torsion to the tube yields a selected set of tire parameters.

11. The non-pneumatic tire of claim 10, wherein the first set of wires is formed from one or more of a set of individual hoops or a strand that sinusoidally winds around the tube axis, and the second set of wires is formed from one or more of a braid, mesh or weave.

12. The non-pneumatic tire of claim 10, wherein the SMA is one of alloys, ternary or quaternary alloys of
NiTi, NiTiX, NiTiXY, Ag—Cd, Au—Cd, Cu—Al—Ni, Cu—Al—Mn, Cu—Al—Mn—$Y_2$ where $Y_2$ is a quaternary alloying addition, Cu—Sn, Cu—Zn, CuZn—$X_2$, Fe—Pt, Mn—Cu, Fe—Mn—Si, Co—Ni—Al, Co—Ni—Ga, Ni—Fe—Ga, Ti—Nb, and ~-Ti,
wherein X and $X_2$ are ternary alloying additions, and Y is a quaternary alloying addition, and
wherein X and Y comprise one or more of Hf, Zr, Au, Ag, Pt, Pd, and Fe, and $X_2$ comprises one or more of Si, Al, and Sn.

13. The non-pneumatic tire of claim 10, wherein the selected set of tire parameters comprise a selected load/deflection response based at least in part on applied geometric material coupling, and at least in part in material processing of the wires.

14. The non-pneumatic tire of claim 10, wherein the selected set of tire parameters is fixed.

15. The non-pneumatic tire of claim 10, wherein the tire further comprises a replaceable outer tread.

16. The non-pneumatic tire of claim 10, wherein the tire is disposed inside a tubed tire.

17. A wheel comprising tread, rim and spokes, wherein the improvement comprises a non-pneumatic tube that comprises:
a matrix of a plurality of layers of wires forming a tube having an axis, wherein a first layer comprises a loop of a cross section of the tube and a second layer that interlaces with the first layer to create a surface of the tube, wherein the first layer is formed from one or more of a set of individual hoops or a strand that sinusoidally winds around the tube axis, wherein the second layer is formed from one or more of a braid, mesh or weave;

wherein the tube ends are mated together to form a torus;

wherein an applied level of torsion to the matrix along the axis of the tube yields a selected set of tire parameters;

wherein the wires comprise a shape memory alloy (SMA) having an austenite crystal structure in an ambient condition, and during an application of an externally applied force upon the tire, the austenite crystal structure of the SMA reorients to a martensitic crystal structure to minimize internal strain energy and decrease local stiffness that accommodate load and large deflection of the SMA, wherein the SMA is one of alloys, ternary or quaternary alloys of NiTi, NiTiX, NiTiXY, Ag—Cd, Au—Cd, Cu—Al—Ni, Cu—Al—Mn, Cu—Al—Mn—$Y_2$ where $Y_2$ is a quaternary alloying addition, Cu—Sn, Cu—Zn, CuZn—$X_2$, Fe—Pt, Mn—Cu, Fe—Mn—Si, Co—Ni—Al, Co—Ni—Ga, Ni—Fe—Ga, Ti—Nb, and ~-Ti, wherein X and $X_2$ are ternary alloying additions, and Y is a quaternary alloying addition, and wherein X and Y comprise one or more of Hf, Zr, Au, Ag, Pt, Pd, and Fe, and $X_2$ comprises one or more of Si, Al, and Sn; and wherein the selected set of tire parameters comprise a selected load/deflection response based at least in part on applied geometric material coupling, and at least in part in material processing of the wires.

\* \* \* \* \*